United States Patent
Moffat et al.

(10) Patent No.: US 6,504,693 B1
(45) Date of Patent: Jan. 7, 2003

(54) NETWORK PROTECTOR RELAY PROVIDING A CLOSE FUNCTION

(75) Inventors: John R. Moffat, Greenwood, SC (US); John C. Schlotterer, Murrysville, PA (US); Thomas J. Kenny, Pittsburgh, PA (US); David M. Oravetz, Coraopolis, PA (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/514,035

(22) Filed: Feb. 25, 2000

(51) Int. Cl.[7] .................................................. H02H 3/00
(52) U.S. Cl. ........................................ 361/62; 361/76
(58) Field of Search .............................. 361/62, 66, 71, 361/72, 80, 81, 64, 68, 69, 73–76, 83

(56) References Cited

U.S. PATENT DOCUMENTS

| | | | |
|---|---|---|---|
| 3,947,728 A | 3/1976 | Smith | |
| 4,972,290 A | 11/1990 | Sun et al. | |
| 4,994,934 A | 2/1991 | Bouhenguel | |
| 5,367,426 A | 11/1994 | Schweitzer, III | |
| 5,587,917 A | 12/1996 | Elms | |
| 5,596,473 A * | 1/1997 | Johnson et al. | 361/97 |
| 5,822,165 A * | 10/1998 | Moran | 361/78 |
| 5,844,781 A | 12/1998 | Schlotterer et al. | |
| 5,936,817 A | 8/1999 | Matsko et al. | |
| 6,175,780 B1 * | 1/2001 | Engel | 700/293 |
| 6,222,714 B1 * | 4/2001 | Hoffman | 361/93.2 |
| 6,239,960 B1 * | 5/2001 | Martin | 361/86 |

* cited by examiner

Primary Examiner—Ronald W. Leja
(74) Attorney, Agent, or Firm—Martin J. Moran

(57) ABSTRACT

A network protector relay for a circuit breaker includes a microcontroller routine which provides a positive sequence network voltage from polyphase network voltages on a network bus. Another microcontroller routine provides a positive sequence phasing voltage from the polyphase network voltages on the network bus and polyphase feeder voltages on a feeder bus. A recloser circuit automatically recloses the circuit breaker connected between the polyphase feeder bus and the polyphase network bus in response to a function of a plurality of setpoints and the positive sequence phasing voltage which indicates a first flow of power from the polyphase feeder bus to the polyphase network bus. A receiver receives a remote close command. Another routine temporarily changes at least one of the setpoints in response to the received close command, in order to conditionally close the circuit breaker for a second flow of power from the polyphase feeder bus to the polyphase network bus, with the second flow of power being less than the first flow of power.

19 Claims, 5 Drawing Sheets

NETWORK PROTECTOR RELAY PROVIDING A CLOSE FUNCTION

BACKGROUND OF THE INVENTION

1. Field of the Invention

This invention relates to network protector relays used to control circuit breakers connecting feeders to low-voltage secondary power distribution networks, and more particularly, to a network protector relay which responds to a close command.

2. Background Information

Low-voltage secondary power distribution networks consist of interlaced loops or grids supplied by two or more sources of power, in order that the loss of any one source will not result in an interruption of power. Such networks provide the highest possible level of reliability with conventional power distribution and are, normally, used to supply high-density load areas, such as a section of a city, a large building or an industrial site. Each source is a medium voltage feeder supplying the network and consisting of a switch, a transformer and a network protector. The network protector consists of a circuit breaker and a control relay. The control relay senses the transformer voltages, the network voltages and the line currents, and executes algorithms to initiate breaker tripping or reclosing action. Trip determination is based on detecting reverse power flow, that is, power flow from the network to the primary feeder.

Examples of network protector relays are disclosed in U.S. Pat. Nos. 3,947,728; 5,822,165; and 5,844,781.

Traditionally, network protector relays were electromechanical devices, which tripped the circuit breaker open upon detection of power flow in the reverse direction. Such relays were provided with a recloser, which reclosed the circuit breaker following a trip when conditions were favorable for forward current flow upon reclosing of the breaker. The electromechanical network protector relays are being replaced. One type of electronic network protector relay mimics the action of the electromechanical relay by calculating power flow.

Another type of electronic network protector relay uses sequence voltages and currents to determine the direction of current flow for making tripping decisions. Sequence analysis, upon which such relays are based, generates three vector sets to represent a three-phase voltage or current: (1) a positive sequence vector, (2) a negative sequence vector, and (3) a zero sequence vector. U.S. Pat. No. 3,947,728 discloses a sequence based network protector relay which uses the positive sequence current and positive sequence voltage vectors to make trip decisions.

More recently, digital sequence based network protector relays have been utilized which periodically sample (e.g., 8, 16, 32 times per cycle) the current and voltages.

FIG. 1 illustrates a secondary power distribution network system 1, which includes a low voltage grid 3 servicing various loads 5. The secondary network bus or grid 3 is energized by multiple sources in the form of feeders 7a,7b, 7c,7d. Feeders 7a and 7b are supplied directly from substations 9a and 9b, respectively. Each of the feeders 7a–7d respectively includes a feeder bus 11a–11d, a switch 13a–13d, a feeder transformer 15a–15d, and a network protector 17a–17d. The secondary network system 1 and its components are three-phase wye or delta connected, although FIG. 1 shows these as a single line for clarity. Each of the network protectors 17a–17d includes network protector circuit breakers 19a–19d and network protector control relays 21a–21d, respectively.

As disclosed in U.S. Pat. No. 5,822,165, which is incorporated by reference herein, the control relays 21a–21d each include a microcontroller-based circuit (not shown) which monitors the network phase to neutral voltages Vn (e.g., Van, Vbn, Vcn), the transformer phase to neutral voltages Vt (e.g., Vat, Vbt, Vct), and the feeder currents I (e.g., Ia, Ib, Ic).

Typically, control relays include a communication module for communication with a remote station over a communication network (hereinafter referred to as a "communication subsystem" in order to avoid confusion with the secondary network bus 3). For example, one or more MPCV control relays, which are marketed by Cutler-Hammer, may be connected to the communication subsystem (e.g., PowerNet or IMPACC Series III as marketed by Cutler-Hammer) to allow remote access to protector measurement data of interest. In turn, the control relays perform breaker trip and reclose functions.

In addition, remote tripping, or more specifically "remote open and block open" control, has been implemented over the communication subsystem. This allows users, such as electric utility maintenance personnel, to remotely open the circuit breaker. See, for example, U.S. Pat. No. 5,936,817. Otherwise, the circuit breaker would remain closed based on the programmed protection parameters of the network protector relay. Those protection parameters open, and continue to block the network protector relay from attempting an automatic reclosure, until a subsequent "remove" block open command is issued. This control is inherently a safe operation, even from a remote location, since energy sources (s) (e.g., transformer(s)) are removed from the network.

Normally, network protector relays, when tripped (open), begin an automatic reclose mode. If the system conditions are correct, then the relay commands a reclosure of the circuit breaker. Specifically, the relay senses the phasing voltage (i.e., the transformer to network difference voltage, which is the voltage across the circuit breaker terminals) relative to the network voltage. In order to generate a reclose command, as disclosed in U.S. Pat. No. 5,822,165, the phasing voltage measurement is compared with various setpoint characteristics. As shown in FIG. 2, the voltage V1p (shown as Vp1 in FIG. 6 of U.S. Pat. No. 5,822,165) has: (1) a magnitude greater than a user-defined 0° master threshold value (Vm); and (2) an angle which is between user-adjustable blinder angles 79,81. Angle 79 is in the negative q, positive d quadrant (II) near the negative q axis, while angle 81 is in the positive q, positive d quadrant (I) near the positive d axis. Also, a circular reclose line 83 is employed which allows circuit breaker reclosing at lighter network loads (e.g., in region 85) than if not provided.

Although the prior art shows various types of reclose algorithms, there is room for improvement.

SUMMARY OF THE INVENTION

The present invention provides a safe implementation of a remotely communicated "close" command (e.g., from a personal computer over a communication subsystem) to a network protector control relay. In accordance with the invention, a qualified remote close command is provided.

As one aspect of the invention, a network protector relay for a circuit breaker includes means for providing a positive sequence network voltage from polyphase network voltages on a network bus; means for providing a positive sequence phasing voltage from the polyphase network voltages on the network bus and polyphase feeder voltages on a feeder bus;

means for automatically reclosing the circuit breaker connected between the polyphase feeder bus and the polyphase network bus in response to a function of a plurality of setpoints and the positive sequence phasing voltage which indicates a first flow of power from the polyphase feeder bus to the polyphase network bus; means for receiving a close command; and means for temporarily changing at least one of the setpoints in response to the received close command, in order to conditionally close the circuit breaker for a second flow of power from the polyphase feeder bus to the polyphase network bus, with the second flow of power being less than the first flow of power.

Preferably, the at least one of the setpoints includes a master characteristic setpoint and the means for temporarily changing includes means for temporarily reducing the master characteristic setpoint. The master characteristic setpoint has a predetermined value, and the means for temporarily changing further includes means for restoring the master characteristic setpoint to the predetermined value after a predetermined time.

As another refinement, the at least one of the setpoints includes a master characteristic setpoint, the means for temporarily changing includes means for temporarily reducing the master characteristic setpoint, and the means for automatically reclosing includes means for comparing the positive sequence phasing voltage to the reduced master characteristic setpoint.

As yet another refinement, the means for providing a positive sequence phasing voltage includes means for providing a corresponding phase angle with the positive sequence phasing voltage, and the means for automatically reclosing includes means for comparing the phase angle to a predetermined angle.

As another aspect of the invention, a network protector relay for controlling a circuit breaker includes means for providing a positive sequence network voltage from polyphase network voltages on the network bus; means for providing a positive sequence phasing voltage from the polyphase network voltages on the network bus and polyphase feeder voltages on the feeder bus; means for automatically reclosing the circuit breaker connected between the polyphase feeder bus and the polyphase network bus in response to a function of a plurality of setpoints and the positive sequence phasing voltage which indicates a first flow of power from the polyphase feeder bus to the polyphase network bus; means for receiving a remote close command; and means for qualifying the remote close command and conditionally initiating closure of the circuit breaker.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The following disclosure describes a mechanism to provide a "remote protective close" function, whereby safety is not compromised.

Electric utilities desire to perform remote manual closure of network protector relays, in order to overcome the nominal automatic operating setpoints employed for reclosure. For example, on lightly loaded networks, one or more of the network circuit breakers may remain open due to the relatively small phasing voltage values associated with such a network. This is because the phasing voltage (i.e., the difference voltage between the transformer and the network) often remains below the master characteristic setpoint during such light load conditions. Unlike remote open control, however, unqualified remote closure is not inherently safe, in that energy source(s) would be added to the system. By design, the network protector relay continually determines if reclosure should occur given the programmed setpoints. If reclosure has not been commanded automatically, then this criterion has not been met. Hence, remotely "overriding" this determination is ill advised.

One possible solution to the problem might be to simply apply a non-qualified closure of the network circuit breaker upon reception of a remote close command. However, remote closure is not quite so simple. A forced unqualified closure of a network circuit breaker can connect a transformer source to a network grid. This could possibly cause a large amount of reverse power to flow from the network and into the source.

Not only is this an undesirable condition from a power flow standpoint, it is a potentially hazardous condition from a safety perspective. For example, if a feeder has been de-energized for maintenance, then the network protector relay would sense the relatively small backfeed of transformer magnetizing current and would properly trip the circuit breaker. In this condition, if a remote close command were issued and the relay, in fact, closed the breaker, then the feeder would suddenly become energized via a network backfeed and safety would be compromised. Therefore, the problem includes providing a remote close capability over the communication subsystem to the network protector relay in order to both: (1) satisfy the utility's maintenance needs; and (2) do so in a manner whereby safety is not compromised.

The remote protective close disclosed herein allows for a remotely commanded close function, not with a simple unqualified forced closure upon receipt of a remote close command, but, instead, by relaxation of one or more programmed operating setpoints for a relatively short time interval after reception of the close command.

Figure 1:
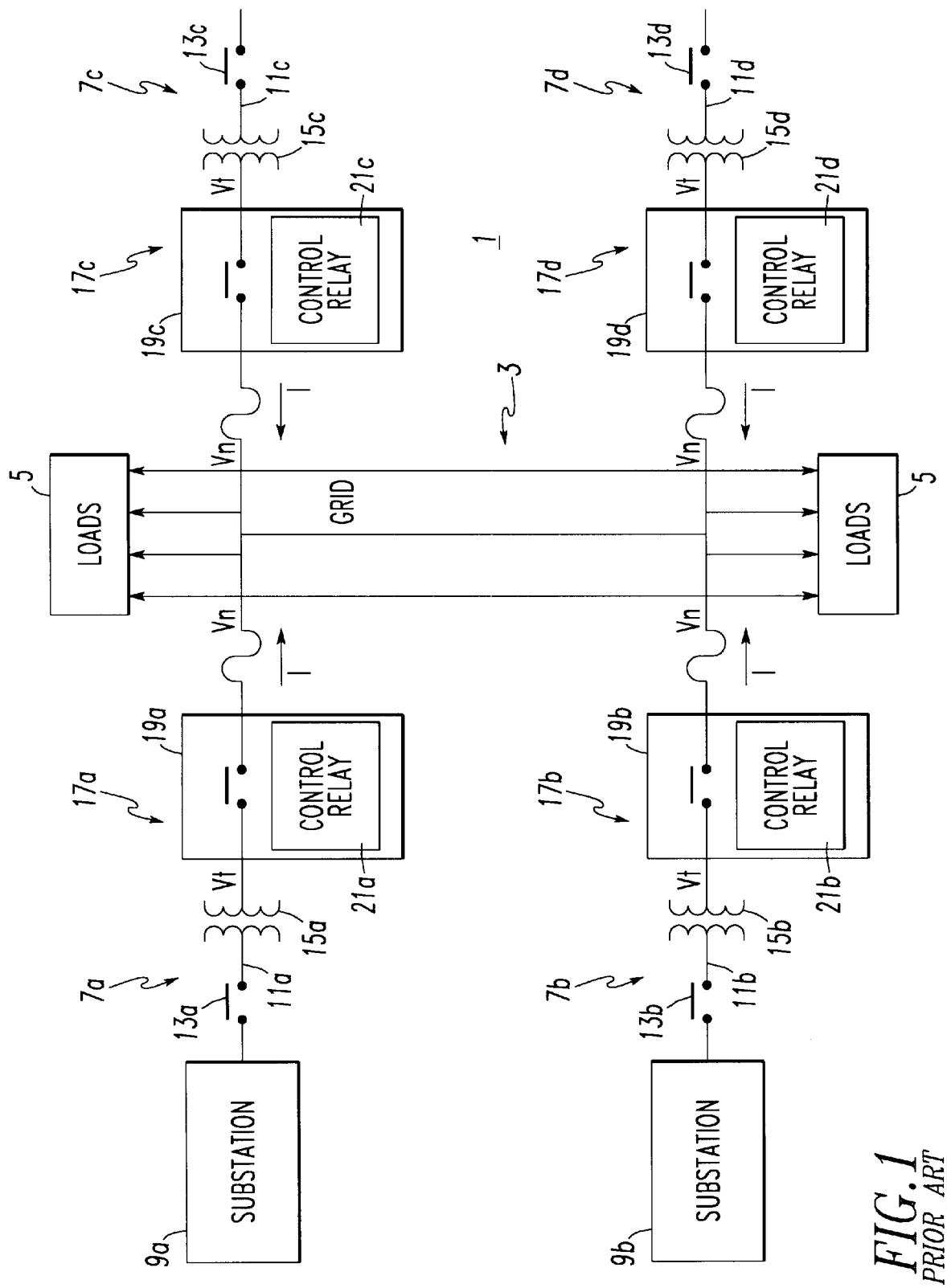
FIG. 1 is a schematic diagram of a low voltage secondary power distribution network sourced by feeders incorporating network protector relays.
Figure 3:
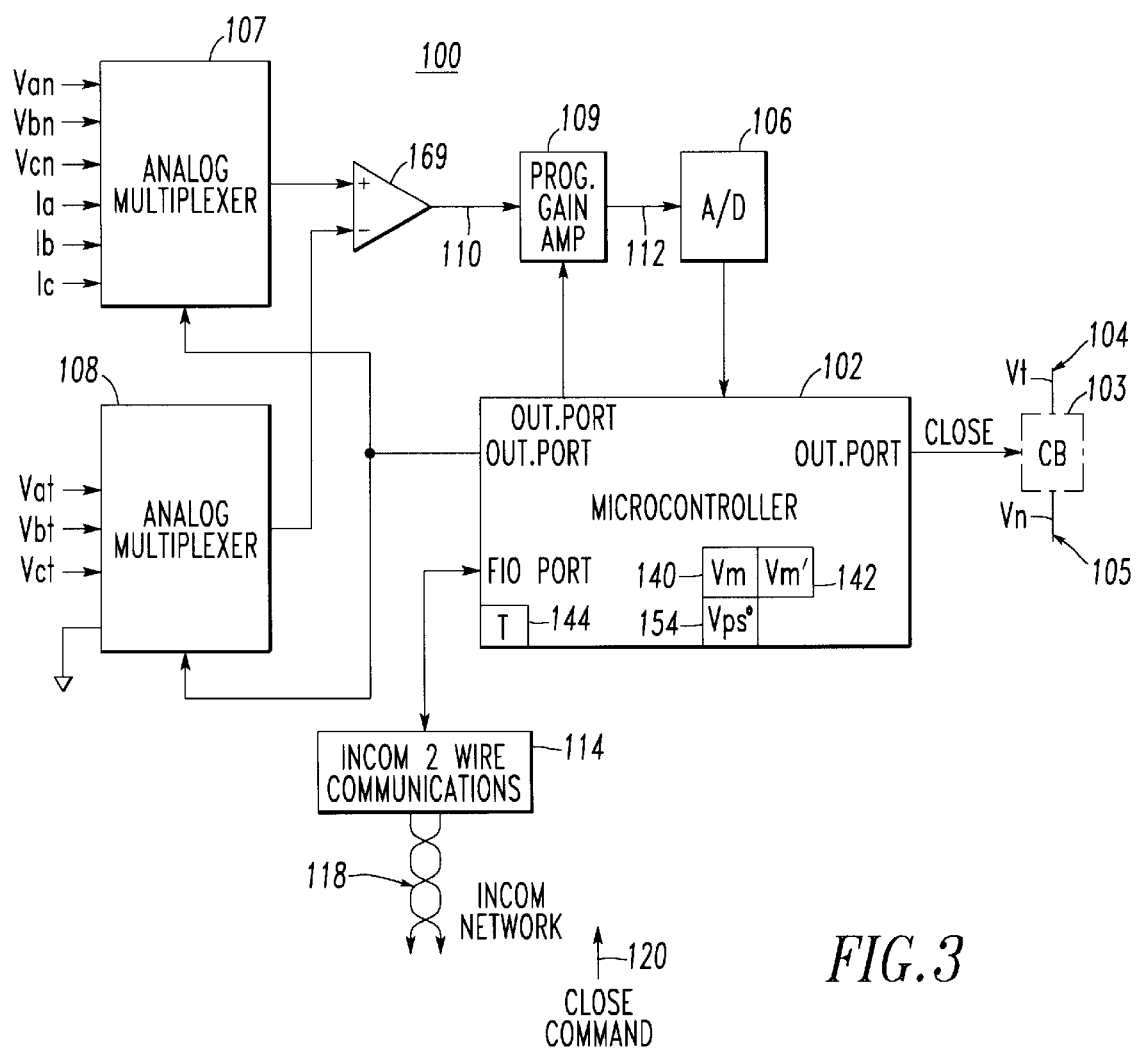
FIG. 3 is a block diagram of a network protector relay in accordance with the invention.

Referring to FIG. 3, a block diagram of a network protector relay 100 is illustrated. The heart of the relay 100 is a microcontroller 102 which monitors the network phase to neutral voltages Van,Vbn,Vcn (e.g., Vn of FIGS. 1 and 3), the transformer phase to neutral voltages Vat,Vbt,Vct (e.g., Vt of FIGS. 1 and 3), and the feeder currents Ia,Ib,Ic (e.g., I of FIG. 1) through current transformers (not shown). The relay 100 controls a circuit breaker (CB) 103 which is connected between a polyphase feeder bus 104 and a polyphase network bus 105. A single exemplary 11 bit plus sign analog to digital (A/D) converter 106 digitizes the polyphase currents and voltages for input to the microcontroller 102. Since a single A/D converter 106 is used, the voltages and currents are sequentially fed thereto by analog multiplexers 107,108 under the control of the microcontroller 102.

As the range of currents can vary widely from reverse magnetization currents of a few ten thousandths per unit to forward overcurrents of about fifteen per unit, a programmable gain amplifier 109 adjusts the gain (e.g., 1, 2, 4, 8, 16) applied to the analog input 110 for application at the input 112 of the A/D converter 106. As disclosed in U.S. Pat. No. 5,822,165, the microcontroller 102 utilizes the sensed currents and voltages in algorithms which generate a circuit breaker trip signal (not shown) in response to detection of reverse current flowing out of the network bus 105 into the feeder bus 104 (e.g., out of network 3 into feeder 7 of FIG. 1), and also in response to forward currents which exceed a preset current/time characteristic. In turn, the control relay 100 performs breaker trip and reclose functions.

Figure 4:
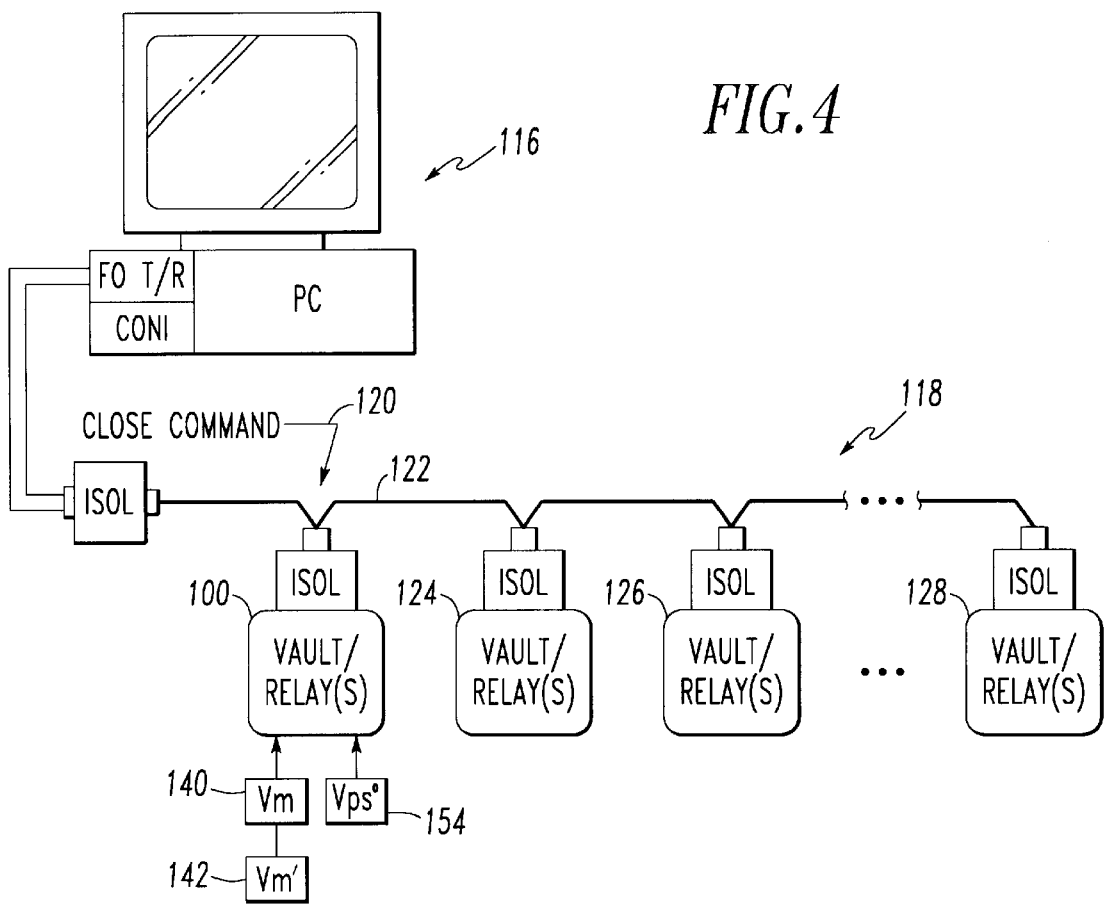
FIG. 4 is a block diagram of a communication subsystem for a plurality of the network protector relays of FIG. 3.

The relay 100 also includes a communication module 114 for communications with a remote station, such as personal computer (PC) 116 of FIG. 4, over a communication subsystem 118. In the exemplary subsystem 118, an INCOM communication subsystem utilizes a protocol which is proprietary to Eaton Corporation, although any suitable communication subsystem may be used. In accordance with the present invention, the remote PC 116 sends a close command 120 over the INCOM cable 122 to the relay 100. The communication module 114 (FIG. 3) of the relay 100 receives the remote close command 120 and employs that command in implementing the "remote protective close" function as discussed below in connection with FIGS. 5–7.

As shown in FIG. 4, one or more of the exemplary network relays 100,124,126,128 are connected to the communication subsystem 118 to allow remote access to protector measurement data of interest. Preferably, the PC 116 monitors the corresponding network circuit breaker's (not shown) open/close state. The PC 116 assumes that the close did not occur in response to the close command 120 if the close state does not occur within a predefined period of time (e.g., greater than about 30 s).

Figure 5:
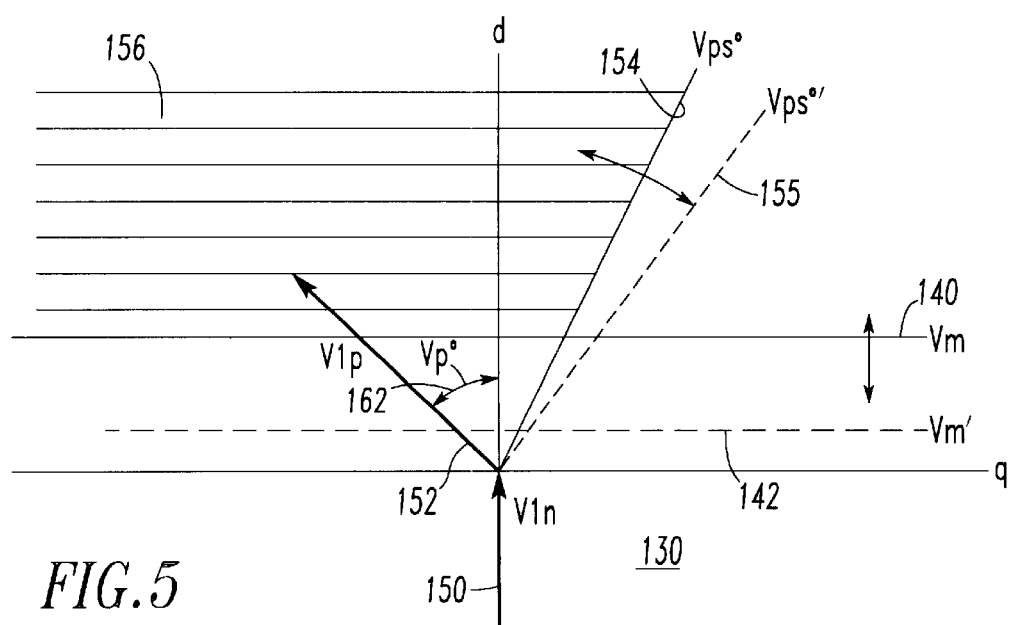
FIG. 5 is a master line close characteristic for the network protector relay of FIG. 3 in accordance with an embodiment of the invention.
Figure 6:
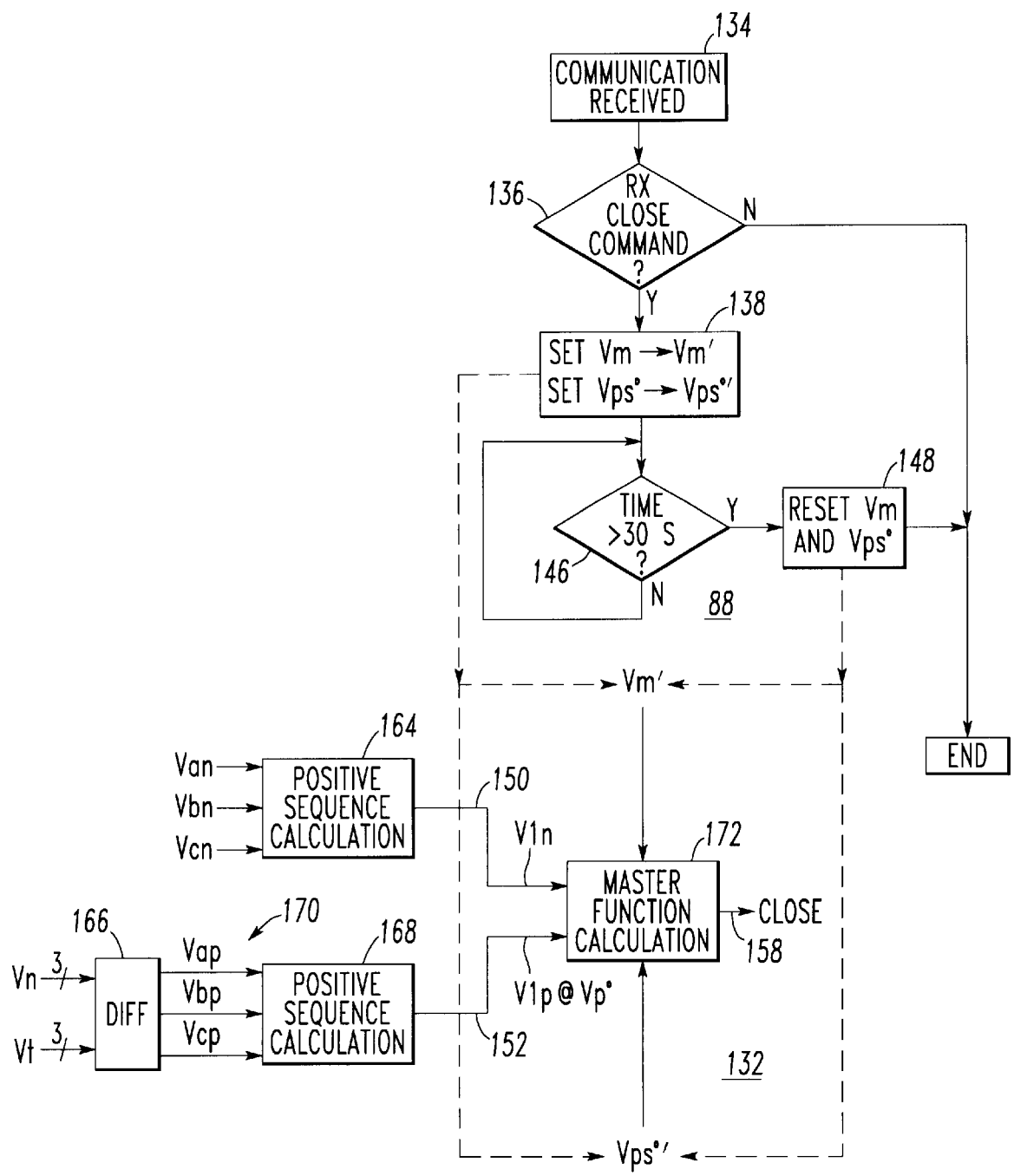
FIG. 6 is a flow chart and block diagram of a routine utilized by the network protector relay of FIG. 3 with the master line close characteristic of FIG. 5.

Referring to FIGS. 5 and 6, a master line close characteristic 130 and a software routine 132 utilized by the relay 100 of FIG. 3 are respectively illustrated. After the communication module 114 receives a communication from the PC 116 of FIG. 4, at 134, the microcontroller 102 determines whether the remote close command 120 was received at 136. If so, then at 138, the microcontroller 102 reduces the master characteristic setpoint (Vm) 140 of FIG. 5 to a reduced master characteristic setpoint (Vm') 142, and sets the normal phasing characteristic setpoint (Vps°) 154 of FIG. 5 to a reduced, but nevertheless safe, setting Vps°' 155 (e.g. −25° with respect to the positive d axis). For example, the normal phasing characteristic setpoint 154 may be user-selected within an exemplary range of about +5° to −25°. Preferably, for safety, a suitable maximum clockwise limit (with respect to the positive d axis) is employed, with the reduced setpoint 155 not being permitted to exceed that limit.

In the preferred embodiment, the reduced setpoint Vm' 142 is the smallest value that the A/D converter 106 of FIG. 3 can resolve, while still ensuring that Vm' 142 is greater than 0 V. As this occurs, a microcontroller timer (T) 144 is started. Thus, the setpoint change is implemented such that the reduced Vm' 142 setting (e.g., without limitation, less than about 100 mV) replaces the normal Vm 140 setting (e.g., without limitation, about 1 V) for just a relatively short time duration (e.g., without limitation, about 30 s). If the system is truly in a light load condition, then the network protective relay 100 makes a close decision using the temporary Vm' 142 threshold in a transparent fashion to that of an unqualified (and, thus, unsafe) hypothetical forced close command.

If, however, the reduced Vm 140 setting, Vm' 142, does not result in the decision to close, then the system conditions are such that closure of CB 103 is not safe or proper. In this case, the timer 144 expires, as monitored and detected at 146, thereby restoring, at 148, the reduced Vm'°142 to the original setting Vm 140, and also restoring the original phasing characteristic setpoint Vps° 154. For non-closure, from the perspective of the communication host, PC 116, the remote close command 120 was effectively "ignored". In comparison to the hypothetical unqualified forced close command, under these circumstances, the "ignored" command is clearly the best choice, as unqualified closure could cause unwanted reverse power flow and possibly hazardous system conditions.

As discussed below in connection with FIGS. 6 and 7, steps 134,136,138,146,148 qualify the remote close command 120 and conditionally initiate closure of the CB 103 by temporarily changing one (FIG. 7) or two (FIG. 6) exemplary setpoints in response to the received remote close command. Hence, the CB 103 is conditionally closed for a second flow of power from the polyphase feeder bus 104 to the polyphase network bus 105, with the second flow of power being less than the first flow of power.

FIG. 5 illustrates the master line close characteristic 130 in the form of a phasor diagram representation of the close criteria. For example, a positive sequence network voltage 150, V1n, is calculated from individual and, in general, unbalanced three-phase network voltages (e.g., Van, Vbn, and Vcn of FIG. 3) on the polyphase network bus 105. The positive sequence network voltage V1n 150 becomes a reference phasor. Similarly, the phasing voltages are measured on each pole of the three-phrase circuit breaker 103, and a balanced positive sequence phasing voltage 152, V1p, is calculated.

If the voltage V1p 152 exceeds the temporary master characteristic threshold Vm' 142 setpoint (FIG. 6, with the original phasing characteristic setpoint Vps° 154 having been temporarily set to, for example, −25°), then the power flow is almost certainly into the network bus 105, rather than exiting that network bus via the circuit breaker 103.

Alternatively, as discussed below in connection with FIG. 7, the phasing voltage vector V1p 152 is compared to both the temporary (reduced) master characteristic threshold Vm' 142 and the original phasing characteristic setpoint Vps° 154.

In summary, under normal operation, a reclose command to the circuit breaker 103 is issued by the network protector relay 100 if V1p 152 resides in the normal close region 156 of FIG. 5 in which: (1) the magnitude of the phasing voltage V1p 152 is greater than the master characteristic setpoint Vm 140; and (2) the angle Vp° 162 of the phasing voltage V1p 152 is located in a counterclockwise region with respect to the phasing characteristic setpoint Vps° 154.

In the embodiment of FIG. 6, after reception of the remote close command 120, a close command 158 to the circuit breaker 103 is issued if V1p 152 is greater than the reduced master characteristic setpoint Vm' 142, with the original phasing setpoint Vps° 154 being reduced to Vps°' 155.

Figure 7:
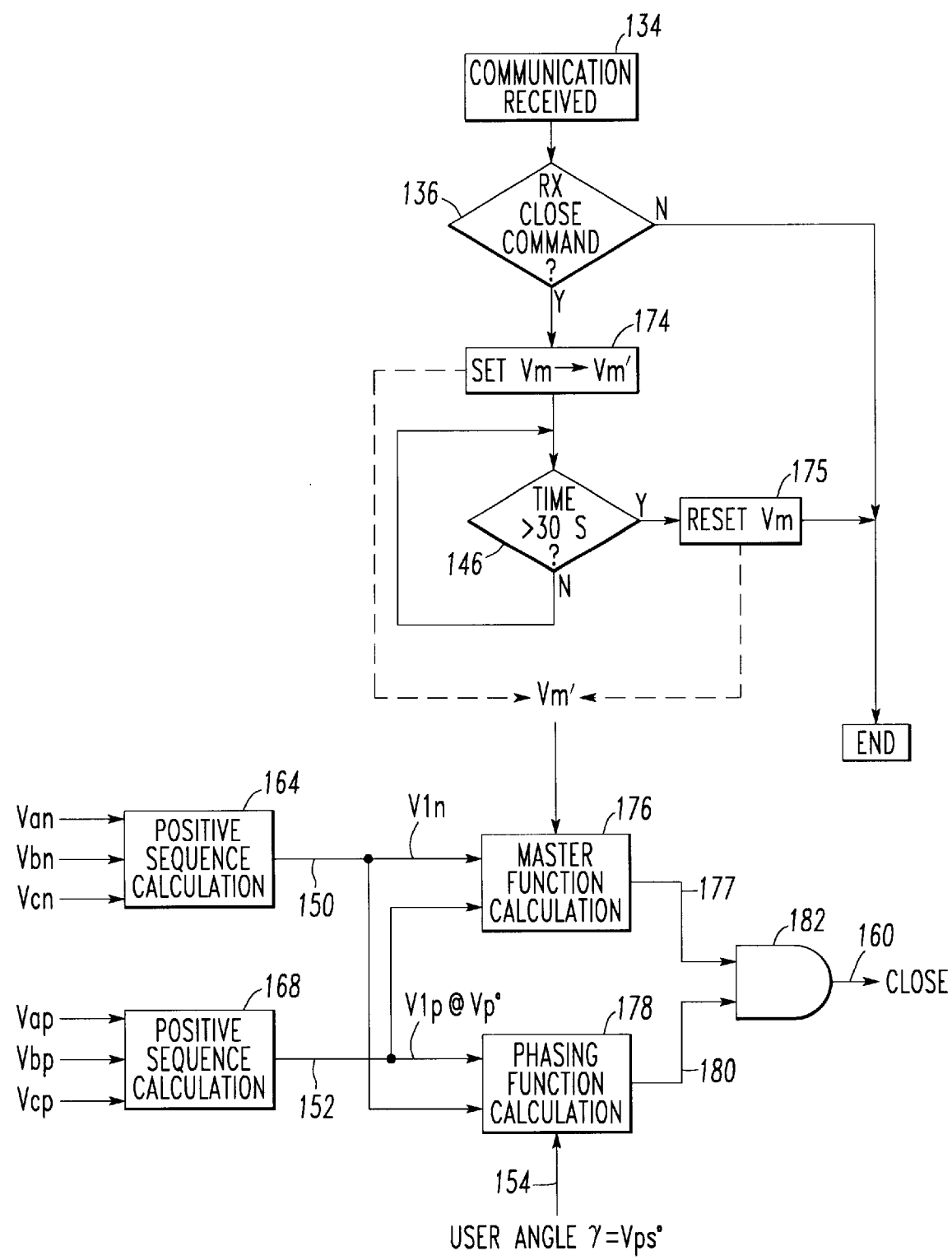
FIG. 7 is a flow chart and block diagram of a routine utilized by the network protector relay of FIG. 3 in accordance with another embodiment of the invention.

Alternatively, in the embodiment of FIG. 7, after reception of the remote close command 120, a close command 160 to the circuit breaker 103 is issued if V1p 152 is greater than the reduced master characteristic setpoint Vm' 142, and if the angle Vp° 162 of the phasing voltage V1p 152 is located in a counterclockwise region with respect to the original phasing characteristic setpoint Vps° 154.

Referring to FIG. 6, as discussed in U.S. Pat. No. 5,822, 165, the microcontroller 102 employs a positive sequence calculation 164 to provide the positive sequence network voltage V1n 150 from the network phase to neutral voltages Van,Vbn,Vcn on the network bus 105. The network phase to neutral voltages Van,Vbn,Vcn on the network bus are sensed through the analog multiplexer 107 (with analog multiplexer 108 outputting a ground reference to the negative input of difference buffer 169), which generates polyphase network voltage samples for A/D 106. In turn, the positive sequence calculation 164 generates the positive sequence network voltage V1n 150 from the converted polyphase network voltage samples.

The microcontroller 102 also employs a difference calculation 166 and a positive sequence calculation 168 to provide the positive sequence phasing voltage V1p 152 from the network phase to neutral voltages Van,Vbn,Vcn on the network bus 105 and the feeder/transformer phase to neutral voltages Vat,Vbt,Vct on the feeder bus 104. Those feeder/transformer phase to neutral voltages Vat,Vbt,Vct are sensed through the analog multiplexer 108 which generates polyphase feeder voltage samples for the A/D 106. The difference calculation 166 generates polyphase phasing voltage samples Vap,Vbp,Vcp 170 from the difference between the polyphase feeder voltage samples and the polyphase network voltage samples (which is the voltage across open CB 103). In turn, the positive sequence calculation 168 generates the balanced positive sequence phasing voltage V1p 152 from the polyphase phasing voltage samples Vap, Vbp,Vcp 170. Preferably, the difference may readily be provided by difference buffer 169 of FIG. 3.

In the exemplary embodiment, in order to calculate positive sequence voltages and current vectors, the fundamental components of each of the sample voltages and current signals are extracted. For example, a Discrete Fourier Transform is employed to extract the fundamental components from the digital samples.

Next, a master function calculation 172 issues a close command 158 to CB 103 if V1p 152 is greater than the reduced master characteristic setpoint Vm' 142, with the original phasing setpoint Vps° 154 being reduced to Vps°' 155. Alternatively, at 148, the original master characteristic setpoint Vm 140 and the original phasing characteristic setpoint Vps° 154 are restored, after which the conventional close region 156 of FIG. 5 is employed. Accordingly, at 172, the CB 103 is automatically reclosed in response to a function of the reduced setpoint Vm' 142, the reduced phasing setpoint Vps°' 155, and the positive sequence phasing voltage V1p 152, which indicates that there is a sufficient flow of power from the polyphase feeder bus 104 to the polyphase network bus 105. Preferably, the A/D converter 106 (FIG. 3), the difference calculation 166 and the positive sequence calculation 168 provide the positive sequence phasing voltage V1p 152 with a predetermined minimum resolution, and the setpoint Vm' 142 is selected to be the smallest positive value that the A/D converter 106 can resolve (e.g., about +100 mV).

As shown in FIG. 7, another embodiment of the present invention is illustrated. This embodiment is similar to the embodiment of FIG. 6, except that at 174, unlike 138 of FIG. 6, the microcontroller 102 only reduces the master characteristic setpoint Vm 140 of FIG. 5 to the reduced master characteristic setpoint Vm' 142, but leaves the phasing characteristic setpoint Vps° 154 unchanged. Then, at 175, the original characteristic setpoint Vm 140 is restored. In this regard, the positive sequence phasing voltage V1p 152 includes a corresponding phase angle, Vp°, 162 as shown in FIG. 5. A master function calculation 176 issues a close permissive 177 if V1p 152 is greater than the reduced master characteristic setpoint Vm' 142. Also, a phasing function calculation 178 compares the original phasing characteristic setpoint Vps° 154 with the phase angle Vp° 162, and issues a close permissive 180 if Vp° 162 is greater than the phasing characteristic setpoint Vps° 154. In turn, the permissives 177,180 are ANDed by AND logic 182 and, if both are set, then the close command 160 is issued to CB 103.

A wide range of additional tests may be employed within the spirit of the present invention. For example, the original phasing characteristic setpoint Vps° 154 may be reduced, but not set to the exemplary −25° limit, in order to extend the Vps° limit in a clockwise direction on the FIG. 5 phasor diagram. Such a modified Vps° setpoint yields a still larger, yet continued safe close region which is tested by a phasing function calculation, such as 178 of FIG. 7.

Figure 2:
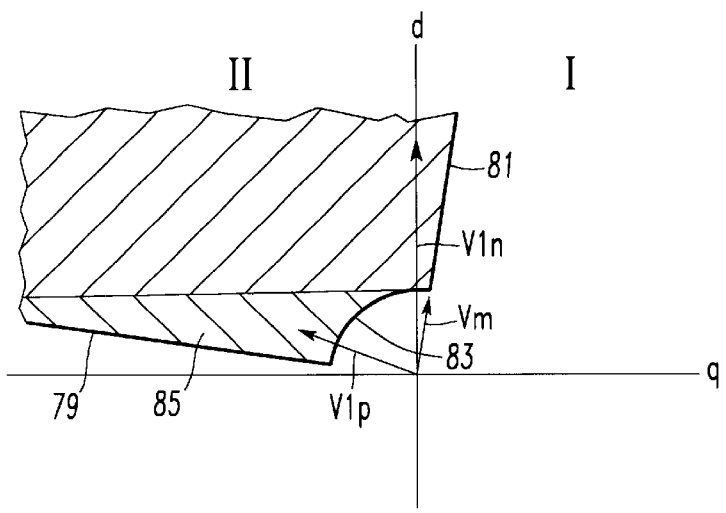
FIG. 2 is a combination of a master line reclose characteristic and a circular reclose characteristic for a network protector relay.

As another alternative, a more complex test such as shown in FIG. 2 may be employed, except that the master threshold value Vm is reduced in order to expand the region 85 toward the origin. In combination with that reduction, as part of the reclose algorithm, the Vp° phasing characteristic 162 is tested to determine whether it exceeds the user-adjustable blinder angle 81 in the positive q, positive d quadrant near the positive d axis. As a still further alternative, the Vp° phasing characteristic 162 is further tested to determine whether it is greater than the user-adjustable blinder angle 81, and less than the user-adjustable blinder angle 79 in the negative q, positive d quadrant near the negative q axis. In this manner, a circular reclose line is provided, similar to line 83 of FIG. 2, except that a reduced master threshold value is employed.

As a still further alternative, the adjustable blinder angle 79 may be rotated more counterclockwise, and/or the adjustable blinder angle 81 may be rotated more clockwise (with respect to the positive d axis), along with the reduction to the master threshold value.

The present invention provides a "remote protective close" function on a communicating network protector relay system by temporarily relaxing one or more normal reclose parametric setpoints upon receipt of a system remote close command. In addition, system level qualifications may also be employed. In this manner, electric utilities may safely use remote relay closure control on a lightly loaded network. With the inherent metering capability of the overall system, the host can easily determine if the system conditions (e.g., a light load in this case) are such that the ability to issue a remote close command is warranted. This essentially prohibits such commands if the system does not meet the particular criteria. Furthermore, the data available at the host provides a wealth of information that can be processed on a system basis to enhance the overall problem solution.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A network protector relay for controlling a circuit breaker connected between a polyphase feeder bus and a polyphase network bus, said network protector relay comprising:

means for providing a positive sequence network voltage from polyphase network voltages on said network bus;

means for providing a positive sequence phasing voltage from said polyphase network voltages on said network bus and polyphase feeder voltages on said feeder bus;

means for automatically reclosing said circuit breaker in response to a function of a plurality of setpoints and said positive sequence phasing voltage which indicates a first flow of power from said polyphase feeder bus to said polyphase network bus;

means for receiving a close command; and means for temporarily changing at least one of said setpoints in response to said received close command, in order to conditionally close said circuit breaker for a second flow of power from said polyphase feeder bus to said polyphase network bus, said second flow of power being less than said first flow of power.

2. The network protector relay of claim 1, wherein said means for providing a positive sequence network voltage includes means for sensing said polyphase network voltages on said network bus to generate polyphase network voltage samples; and means for generating said positive sequence network voltage from said polyphase network voltage samples.

3. The network protector relay of claim 2, wherein said means for providing a positive sequence phasing voltage includes means for sensing said polyphase feeder voltages on said feeder bus to generate polyphase feeder voltage samples; means for generating polyphase phasing voltage samples from the difference between said polyphase feeder voltage samples and said polyphase network voltage samples; and means for generating said positive sequence phasing voltage from said polyphase phasing voltage samples.

4. The network protector relay of claim 1, wherein said means for receiving a close command includes means for receiving a remote close command.

5. The network protector relay of claim 1, wherein said means for receiving a close command includes means for receiving a remote close command from a communication subsystem.

6. The network protector relay of claim 1, wherein said at least one of said setpoints includes a master characteristic setpoint; and wherein said means for temporarily changing includes means for temporarily reducing said master characteristic setpoint.

7. The network protector relay of claim 6, wherein said master characteristic setpoint has a predetermined value; and wherein said means for temporarily changing further includes means for restoring said master characteristic setpoint to said predetermined value after a predetermined time.

8. The network protector relay of claim 7, wherein said predetermined time is about 30 seconds.

9. The network protector relay of claim 1, wherein said means for providing a positive sequence phasing voltage includes means for providing said positive sequence phasing voltage with a predetermined minimum resolution; and wherein said means for temporarily changing includes means for providing a reduced master characteristic setpoint which is at least as great as said predetermined minimum resolution.

10. The network protector relay of claim 9, wherein said predetermined minimum resolution is less than about 100 mV.

11. The network protector relay of claim 1, wherein said means for providing a positive sequence phasing voltage includes means for providing a corresponding phase angle with said positive sequence phasing voltage; and wherein said means for automatically reclosing includes means for comparing said phase angle to a predetermined angle.

12. The network protector relay of claim 1, wherein said positive sequence phasing voltage is a balanced positive sequence phasing voltage.

13. The network protector relay of claim 1, wherein said at least one of said setpoints includes a master characteristic setpoint; wherein said means for temporarily changing includes means for temporarily reducing said master characteristic setpoint; and wherein said means for automatically reclosing includes means for comparing said positive sequence phasing voltage to said reduced master characteristic setpoint.

14. The network protector relay of claim 1, wherein said means for providing a positive sequence phasing voltage includes means for providing an angle of said positive sequence phasing voltage; wherein said at least one of said setpoints includes a master characteristic setpoint and a phasing characteristic setpoint; wherein said means for temporarily changing includes means for temporarily reducing said master characteristic setpoint; and wherein said means for automatically reclosing includes means for comparing said positive sequence phasing voltage to said reduced master characteristic setpoint, and means for comparing said angle to said phasing characteristic setpoint.

15. A network protector relay for controlling a circuit breaker connected between a polyphase feeder bus and a polyphase network bus, said network protector relay comprising:

means for providing a positive sequence network voltage from polyphase network voltages on said network bus;

means for providing a positive sequence phasing voltage from said polyphase network voltages on said network bus and polyphase feeder voltages on said feeder bus;

means for automatically reclosing said circuit breaker in response to a function of a plurality of setpoints and said positive sequence phasing voltage which indicates a first flow of power from said polyphase feeder bus to said polyphase network bus;

means for receiving a remote close command;

means for qualifying the remote close command and conditionally initiating closure of said circuit breaker; and wherein said means for qualifying the remote close command includes means for temporarily changing said at least one of said setpoints in response to said received remote close command, in order to conditionally close said circuit breaker for a second flow of power from said polyphase feeder bus to said polyphase network bus, said second flow of power being less than said first flow of power.

16. The network protector relay of claim 15, wherein said at least one of said setpoints includes a master characteristic setpoint; and wherein said means for temporarily changing temporarily reduces said master characteristic setpoint.

17. The network protector relay of claim 16, wherein said master characteristic setpoint has a predetermined value; and wherein said means for qualifying further includes means for restoring said master characteristic setpoint to said predetermined value after a predetermined time.

18. The network protector relay of claim 15, wherein said means for providing a positive sequence phasing voltage includes means for providing a phase angle of said positive sequence phasing voltage; and wherein said means for automatically reclosing includes means for comparing said phase angle to a predetermined angle.

19. The network protector relay of claim 18, wherein said at least one of said setpoints includes a master characteristic setpoint and said predetermined angle; and wherein said means for temporarily changing temporarily changes both said master characteristic setpoint and said predetermined angle.

* * * * *